(12) United States Patent
Lee et al.

(10) Patent No.: US 12,432,659 B2
(45) Date of Patent: *Sep. 30, 2025

(54) METHOD FOR REDUCING POWER CONSUMPTION OF TERMINAL IN MOBILE COMMUNICATION SYSTEM USING MULTI-CARRIER STRUCTURE

(71) Applicant: Electronics and Telecommunications Research Institute, Daejeon (KR)

(72) Inventors: Kyoung Seok Lee, Daejeon (KR); Jae Heung Kim, Daejeon (KR); Tae Gyun Noh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/412,653

(22) Filed: Jan. 15, 2024

(65) Prior Publication Data
US 2024/0155497 A1 May 9, 2024

Related U.S. Application Data

(63) Continuation of application No. 18/090,504, filed on Dec. 29, 2022, now Pat. No. 11,877,243, which is a
(Continued)

(30) Foreign Application Priority Data

Oct. 1, 2009 (KR) .................. 10-2009-0093895
Jan. 8, 2010 (KR) .................. 10-2010-0001516

(51) Int. Cl.
*H04W 52/02* (2009.01)
*H04L 5/00* (2006.01)
(Continued)

(52) U.S. Cl.
CPC ......... *H04W 52/0235* (2013.01); *H04L 5/001* (2013.01); *H04L 5/0053* (2013.01);
(Continued)

(58) Field of Classification Search
CPC ......... H04W 52/0235; H04W 52/0219; H04W 52/0222; H04W 52/0225; H04W 52/0229;
(Continued)

(56) References Cited

U.S. PATENT DOCUMENTS 10,405,277 B2 9/2019 Lee et al.
10,863,439 B2 12/2020 Lee et al.
(Continued)

FOREIGN PATENT DOCUMENTS

KR 10-2008-0014027 2/2008
KR 10-2008-0084739 9/2008
(Continued)

OTHER PUBLICATIONS

CATI, "Consideration on DRX," 3GPP TSG RAN WG2 Meeting #66bis, R2-093725 (2009).
(Continued)

*Primary Examiner* — Chi Tang P Cheng
(74) *Attorney, Agent, or Firm* — Insight Law Group, PLLC; Seung Lee

(57) ABSTRACT

A method for reducing power consumption of a terminal that communicates with a base station in a mobile communication system using a multi-carrier structure composed of a primary component carrier and at least one secondary component carrier comprises: receiving a discontinuous reception (DRX) parameter group for multi carriers from the base station; and setting the multi carriers to the same parameter value, by using the received parameter group. The method for reducing power consumption of the terminal further comprises: performing a downlink control channel receive
(Continued)

operation on each carrier according to a DRX cycle. As the base station in the mobile communication system using the multi-carrier structure simplifies the DRX process for reducing power consumption of a terminal by reducing signaling load for the multi-carrier control of the terminal, it becomes possible to reduce power consumption of the terminal.

18 Claims, 4 Drawing Sheets

Related U.S. Application Data continuation of application No. 17/111,438, filed on Dec. 3, 2020, now Pat. No. 11,570,714, which is a continuation of application No. 16/541,203, filed on Aug. 15, 2019, now Pat. No. 10,863,439, which is a continuation of application No. 15/659,339, filed on Jul. 25, 2017, now Pat. No. 10,405,277, which is a continuation of application No. 14/923,468, filed on Oct. 27, 2015, now Pat. No. 9,717,053, which is a continuation of application No. 13/383,455, filed as application No. PCT/KR2010/006730 on Oct. 1, 2010, now Pat. No. 9,191,179.

(51) Int. Cl.
| | |
|---|---|
| *H04W 72/23* | (2023.01) |
| *H04W 76/27* | (2018.01) |
| *H04W 76/28* | (2018.01) |
| *H04L 5/06* | (2006.01) |
| *H04L 5/14* | (2006.01) |
| *H04L 5/16* | (2006.01) |
| *H04L 5/18* | (2006.01) |
| *H04L 5/26* | (2006.01) |
| *H04W 28/02* | (2009.01) |
| *H04W 88/02* | (2009.01) |
| *H04W 88/08* | (2009.01) |

(52) U.S. Cl.
CPC .......... *H04L 5/0096* (2013.01); *H04L 5/0098* (2013.01); *H04W 52/0212* (2013.01); *H04W 52/0216* (2013.01); *H04W 72/23* (2023.01); *H04W 76/27* (2018.02); *H04W 76/28* (2018.02); *H04L 5/06* (2013.01); *H04L 5/14* (2013.01); *H04L 5/16* (2013.01); *H04L 5/18* (2013.01); *H04L 5/26* (2013.01); *H04W 28/0221* (2013.01); *H04W 28/0263* (2013.01); *H04W 28/0278* (2013.01); *H04W 52/0219* (2013.01); *H04W 52/0222* (2013.01); *H04W 52/0225* (2013.01); *H04W 52/0229* (2013.01); *H04W 52/0232* (2013.01); *H04W 52/0261* (2013.01); *H04W 52/0264* (2013.01); *H04W 52/0274* (2013.01); *H04W 52/0277* (2013.01); *H04W 52/028* (2013.01); *H04W 52/0283* (2013.01); *H04W 88/02* (2013.01); *H04W 88/08* (2013.01); *Y02D 30/70* (2020.08)

(58) Field of Classification Search
CPC ......... H04W 52/0232; H04W 52/0261; H04W 52/0264; H04W 52/0274; H04W 52/0277; H04W 52/028; H04W 52/0283; H04W 52/0212; H04W 52/0216; H04W 76/28; H04W 76/27; H04W 72/23; H04W 28/0221; H04W 28/0263; H04W 28/0278; H04W 88/02; H04W 88/08; H04L 5/001; H04L 5/0053; H04L 5/0096; H04L 5/0098; H04L 5/06; H04L 5/14; H04L 5/16; H04L 5/18; H04L 5/26; Y02D 30/70

USPC ......................................................... 370/311
See application file for complete search history.

(56) References Cited

U.S. PATENT DOCUMENTS

| | | | |
|---|---|---|---|
| 11,570,714 B2 | 1/2023 | Lee et al. | |
| 2009/0257387 A1 | 10/2009 | Gholmieh et al. | |
| 2009/0285141 A1* | 11/2009 | Cai | H04W 52/0251 |
| | | | 370/311 |
| 2009/0316575 A1 | 12/2009 | Gholmieh et al. | |
| 2010/0002592 A1 | 1/2010 | Effenberger et al. | |
| 2010/0322158 A1* | 12/2010 | Lee | H04L 1/0072 |
| | | | 370/329 |
| 2012/0314635 A1 | 12/2012 | Lee et al. | |
| 2014/0016506 A1 | 1/2014 | Gauvreau et al. | |

FOREIGN PATENT DOCUMENTS

| | | |
|---|---|---|
| WO | 07/073118 A1 | 6/2007 |
| WO | 08/084938 A1 | 7/2008 |
| WO | 08/111823 A1 | 9/2008 |
| WO | 09/120124 A1 | 10/2009 |

OTHER PUBLICATIONS

Ericsson, "Carrier aggregation in LTE-Advanced," TSG-RAN WG1 #53bis, R1-082468 (2008).
Notice of allowance mailed Apr. 24, 2019 for U.S. Appl. No. 15/659,339.
Non-final office action mailed Oct. 25, 2018 for U.S. Appl. No. 15/659,339.
Final office action mailed May 18, 2018 for U.S. Appl. No. 15/659,339.
Non-final office action mailed Sep. 19, 2017 for U.S. Appl. No. 15/659,339.
Notice of allowance mailed Mar. 27, 2017 for U.S. Appl. No. 14/923,468.
Final office action mailed Aug. 25, 2016 for U.S. Appl. No. 14/923,468.
Non-final office action mailed Nov. 17, 2015 for U.S. Appl. No. 14/923,468.
Notice of allowance mailed Jul. 15, 2015 for U.S. Appl. No. 13/383,455.
Final office action mailed Dec. 10, 2014 for U.S. Appl. No. 13/383,455.
Non-final office action mailed Feb. 26, 2014 for U.S. Appl. No. 13/383,455.
International Search Report mailed May 24, 2011 for PCT/KR2010/006730 and its English translation.
Non-final office action mailed Feb. 21, 2020 for U.S. Appl. No. 16/541,203.
Notice of Allowance mailed Aug. 6, 2020 for U.S. Appl. No. 16/541,203.
Complaint filed Mar. 17, 2021 in the Western District of Texas (Waco Division) for Case No. 6:21-cv-00270.
Amended Complaint filed Apr. 22, 2022 in the Eastern District of Texas for Case No. 2:22-cv-00097.
Non-final office action mailed Apr. 11, 2022 for U.S. Appl. No. 17/111,438.
Notice of Allowance mailed Oct. 3, 2022 for U.S. Appl. No. 17/111,438.
Non-final Office Action mailed May 19, 2023 for U.S. Appl. No. 18/090,504.
Notice of Allowance mailed Sep. 10, 2023 for U.S. Appl. No. 18/090,504.

* cited by examiner

METHOD FOR REDUCING POWER CONSUMPTION OF TERMINAL IN MOBILE COMMUNICATION SYSTEM USING MULTI-CARRIER STRUCTURE

CROSS-REFERENCE TO RELATED APPLICATIONS

This application is a continuation of U.S. application Ser. No. 18/090,504, filed on Dec. 29, 2022 (now pending), which is a continuation of U.S. application Ser. No. 17/111,438, filed on Dec. 3, 2020 (now U.S. Pat. No. 11,570,714), which is a continuation of U.S. application Ser. No. 16/541,203, filed on Aug. 15, 2019 (now U.S. Pat. No. 10,863,439), which is a continuation of U.S. application Ser. No. 15/659,339, filed on Jul. 25, 2017 (now U.S. Pat. No. 10,405,277), which is a continuation of U.S. application Ser. No. 14/923,468, filed on Oct. 27, 2015 (now U.S. Pat. No. 9,717,053), which is a continuation of U.S. application Ser. No. 13/383,455, filed on Jan. 11, 2012 (now U.S. Pat. No. 9,191,179), which is a 371 national phase entry of International Application Number PCT/KR2010/006730, filed on Oct. 1, 2010, which claims priority to, and the benefit of, Korean Application Nos. 10-2010-0001516, filed on Jan. 8, 2010 and 10-2009-0093895, filed on Oct. 1, 2009. The contents of the aforementioned applications are incorporated herein by reference in their entirety.

TECHNICAL FIELD

Example embodiments of the present invention relate in general to a method of reducing power consumption of a terminal in a long term evolution (LTE) system, which is under standardization by 3rd Generation Partnership Project (3GPP), performing communication between a base station and the terminal, and more specifically to a method for a base station to efficiently control a discontinuous reception (DRX) operation of a terminal in a mobile communication system using multiple carriers.

BACKGROUND ART

3GPP, a mobile communication standardization organization, developed the LTE system standard to develop a next-generation mobile communication standard. Also, to meet International Mobile Telecommunication (IMT)-advanced requirements suggested by International Telecommunication Union Radio communications (ITU-R), an LTE-advanced system standard, which is an extended LTE standard, is under development.

The LTE standard supports a maximum wireless bandwidth of 20 MHz for mobile communication, and the LTE-advanced standard uses carrier aggregation technology to support a maximum bandwidth of 100 MHz. Thus, the bandwidth of 100 MHz is divided into component carriers (CCs) having a maximum bandwidth of 20 MHz, and a base station and a terminal can communicate with each other using a plurality of CCs at the same time.

Since a terminal operating in a carrier aggregation structure receives a plurality of wireless channels in a wideband, power consumption increases. To solve this problem, a control procedure for minimizing power consumption in a multi-carrier environment is needed.

DISCLOSURE

Technical Problem

Accordingly, in order to substantially obviate one or more problems due to limitations and disadvantages of the related art, an object of the present invention provide a method of reducing power consumption of a terminal communicating with a base station in a mobile communication system using multiple carriers for reducing power consumption of terminals.

One aspect of the present invention provides a method of reducing power consumption of a terminal communicating with a base station using multiple carriers includes: receiving one discontinuous reception (DRX) parameter group for multiple carriers from the base station; receiving a value of the one parameter group, and setting the multiple carriers to the same parameter value; and performing an operation of receiving a downlink (DL) control channel for each of the carriers according to a DRX cycle. Also, the performing the operation of receiving the DL control channel for each of the carriers according to the DRX cycle may include performing, at all the carriers, the operation of receiving the DL control channel in the same way. The performing the operation of receiving the DL control channel for each of the carriers according to the DRX cycle may include: when the DL control channel is received on a carrier of the terminal, interpreting the received control channel to demodulate the corresponding data channel; and continuously performing an on-duration operation until a new control channel is received in a next subframe time, and then switching to a sleep operation when a new control channel is not received during a time of an inactivity timer. The performing the operation of receiving the DL control channel for each of the carriers according to the DRX cycle may include, when a carrier indicator (CI) is included in the received control channel, receiving a data channel of a carrier corresponding to a carrier number indicated by the CI and demodulating data. The terminal may receive a message instructing the terminal to switch a DRX operation cycle for another carrier from a short DRX cycle to a long DRX cycle, a message instructing the terminal to switch the DRX operation cycle for the other carrier from the long DRX cycle to the short DRX cycle, a message instructing the terminal to stop an operation of transmitting and receiving the other carrier, and a message instructing the terminal to start the operation of transmitting and receiving the other carrier from the base station. The performing the operation of receiving the DL control channel for each of the carriers according to the DRX cycle may include, when the terminal receives a physical downlink control channel (PDCCH) in a long DRX period state, demodulating the PDCCH or a physical downlink shared channel (PDSCH), and when it is not necessary to switch to a short DRX period state, staying in the long DRX period state. The performing the operation of receiving the DL control channel for each of the carriers according to the DRX cycle may include: when the terminal receives the PDCCH in the long DRX period state, demodulating the PDCCH or the PDSCH to determine whether or not a type of data requires continuous data communication; when it is determined that the type of data does not require continuous data communication, staying in the long DRX period state; and when it is determined that the type of data requires continuous data communication, switching to the short DRX period state. A case in which the type of data does not require continuous data communication may include at least one of a case in which the base station allocates an uplink (UL) radio resource but there is no data in a buffer of the terminal, a case in which the base station requests UL transmission to maintain UL synchronization, a case in which the base station requests UL transmission to search for location information about the terminal, and a case in which the base station requests a DL channel state report.

Another aspect of the present invention provides a method of reducing power consumption of a terminal communicating with a base station using multiple carriers includes: transmitting, at the base station, a configuration message to the terminal so that the terminal can carry out a configuration procedure of controlling a plurality of carriers; and transmitting, at the base station, a carrier activation message to the terminal so that the terminal stands by without using a carrier, which is instructed to be configured by the configuration message, for communication with the base station and then uses a carrier, which is instructed to be activated by the carrier activation message, for communication with the base station when a carrier activation procedure is complete. The activation message may be transmitted through a data channel transmitted to the terminal by the base station, and may include at least one of an activation carrier number, a deactivation carrier number, an activation identity, and a deactivation identity. A plurality of the carrier activation messages may be stored in one data channel transmitted to the terminal, and transmitted. The base station may transmit a deactivation message to the terminal to switch the terminal to a standby state for the activated carrier. The carrier activation procedure may be carried out for a DL carrier. The carrier activation procedure may be carried out for a UL carrier in connection with activation of the DL carrier. To be specific, in the UL carrier activation procedure carried out in connection with activation of the DL carrier, the base station may include mapping information about the UL carrier interoperating with the DL carrier in a DL configuration message and transmit the DL configuration message to the terminal so that the UL carrier mapped to the DL carrier instructed to be activated is activated and used for communication with the base station when the DL carrier is instructed to be activated by the terminal.

Still another aspect of the present invention provides a method of reducing power consumption of a terminal communicating with a base station in a mobile communication system using multiple carriers including a primary component carrier and at least one secondary component carrier includes: transmitting, at the base station, a configuration message to the terminal; and transmitting, at the base station, a carrier activation message to the terminal. The configuration message may include carrier mapping information between UL carriers interoperating with the DL carriers. The method may further include having a DL carrier indicated by the carrier activation message to be activated. When the carrier mapping information is included in the configuration message and transferred to the terminal, the UL carriers may be implicitly activated in connection with activation of the DL carriers. DL carriers may be activated in connection with activation of DL carriers. Different numbers of the DL carriers and the UL carriers may be mapped to each other. When the different numbers of the DL carriers and the UL carriers are mapped to each other, the UL carriers may be implicitly activated in connection with activation of the DL carriers by including the carrier mapping information in the configuration message and transferring the configuration message to the terminal. The configuration message may be a radio resource control (RRC) message including the number of additional secondary cells (Scells) and secondary component carrier (SCC) control information. The activation message may be transmitted to the terminal through a media access control (MAC) control message. The activation message may be included in a data channel in the MAC control message and transmitted. A plurality of the carrier activation messages may be stored in the data channel in the MAC control message transmitted to the terminal, and transmitted. The MAC control message may include a control channel and a data channel, and the data channel may include a data channel header, the carrier activation message, and traffic data. The method may further include transmitting, at the base station, a carrier deactivation message to the terminal to switch the terminal to a standby state for a carrier indicated by the carrier activation message. The carrier activation message may include at least one of a physical uplink control channel (PUCCH), which is a UL control channel, and a transmission cycle of a sounding reference symbol (SRS).

Advantageous Effects

According to example embodiments of the present invention, a base station in a mobile communication system using multiple carriers reduces signaling for multi-carrier control of a terminal to simplify a DRX procedure for reducing power consumption of the terminal, so that the power consumption of the terminal can be reduced. Also, using a simplified control message, a call processing procedure of the system can be reduced.

BEST MODE

Figure 1:
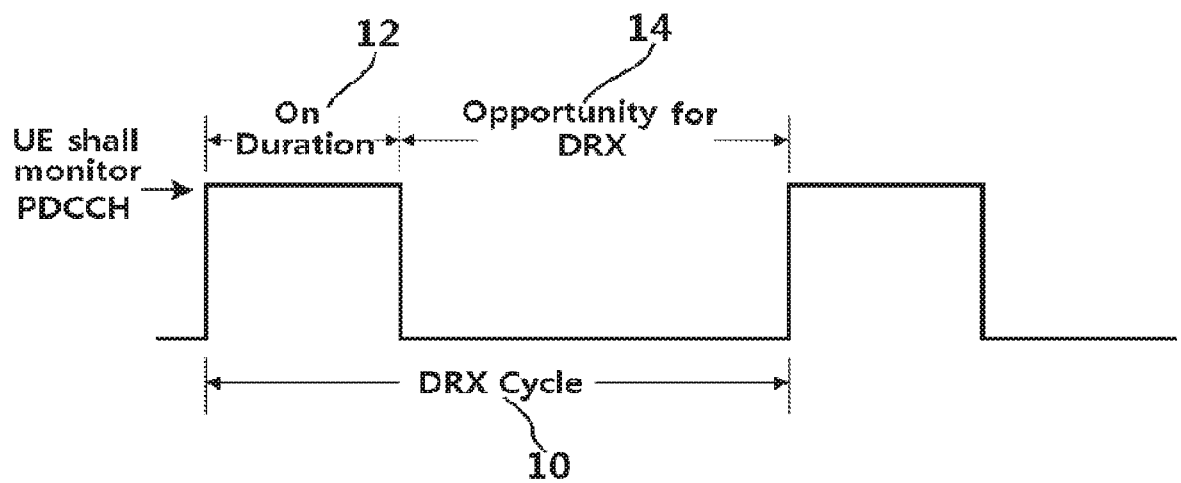
FIG. 1 is a timing diagram illustrating a discontinuous reception (DRX) operation of a terminal in a mobile communication system.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "terminal" used herein may be referred to as a mobile station (MS), user equipment (UE), user terminal (UT), wireless terminal, access terminal (AT), subscriber unit, subscriber station (SS), wireless device, wireless communication device, wireless transmit/receive unit (WTRU), moving node, mobile, or other terms. Various example embodiments of a terminal may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or terminals having a combination of such functions, but are not limited to these.

The term "base station" used herein generally denotes a fixed point communicating with a terminal, and may be referred to as a Node-B, evolved Node-B (eNode-B), base transceiver system (BTS), access point, and other terms. One or more cells can be present in the coverage area of one base station.

The term "carrier" used herein has the same meaning as a component carrier (CC) when carrier aggregation is applied to the carrier.

The term "primary cell (Pcell)" used herein denotes a cell that is initially configured during connection establishment, and plays an essential role with regard to security, upper layer system information, and some lower layer functions.

The term "secondary cell (Scell)" used herein denotes a cell that is configured after connection establishment to merely provide additional radio resources.

The term "serving cell" may denote a Pcell or Scell, and may be used to denote a set of one or more cells including a Pcell and all Scells.

In the case of carrier aggregation, one serving cell provides non-access stratum (NAS) mobility information, e.g., a tracking area identity (TAI), upon radio resource control (RRC) connection establishment/connection re-establishment/handover, and one serving cell provides a security input upon RRC connection re-establishment/handover. Here, the TAI denotes a tracking area for managing base stations located within a predetermined range together, and is generated as a unit managed by the NAS from a public land mobile network (PLMN) identity that the tracking area belongs to and a tracking area code (TAC) of the tracking area. Such a serving cell will be defined as a Pcell below.

In the case of carrier aggregation, carriers can be classified as a primary component carrier (PCC) and a secondary component carrier (SCC).

In a downlink (DL), a carrier corresponding to the Pcell is defined as a DL PCC, and in an uplink (UL), a carrier corresponding to the Pcell is defined as a UL PCC.

According to a capability of a terminal, a Scell can constitute a set of serving cells together with a Pcell. In a DL, a carrier corresponding to the Scell is defined as a DL SCC, and in a UL, a carrier corresponding to the Scell is defined as a UL SCC.

Thus, a set of serving cells for one terminal includes one Pcell and at least one Scell. The number of configurable serving cells can be set according to an aggregation capability of the terminal. The Pcell can be changed only through a handover procedure. The Pcell is used for transmission of a UL control channel, e.g., a physical uplink control channel (PUCCH). The Pcell can be distinguished from the Scell in that the Pcell cannot be deactivated.

Hereinafter, example embodiments of the present invention will be described in detail with reference to the appended drawings. To aid in understanding the present invention, like numbers refer to like elements throughout the description of the figures, and description of the same component will not be reiterated.

Figure 2:
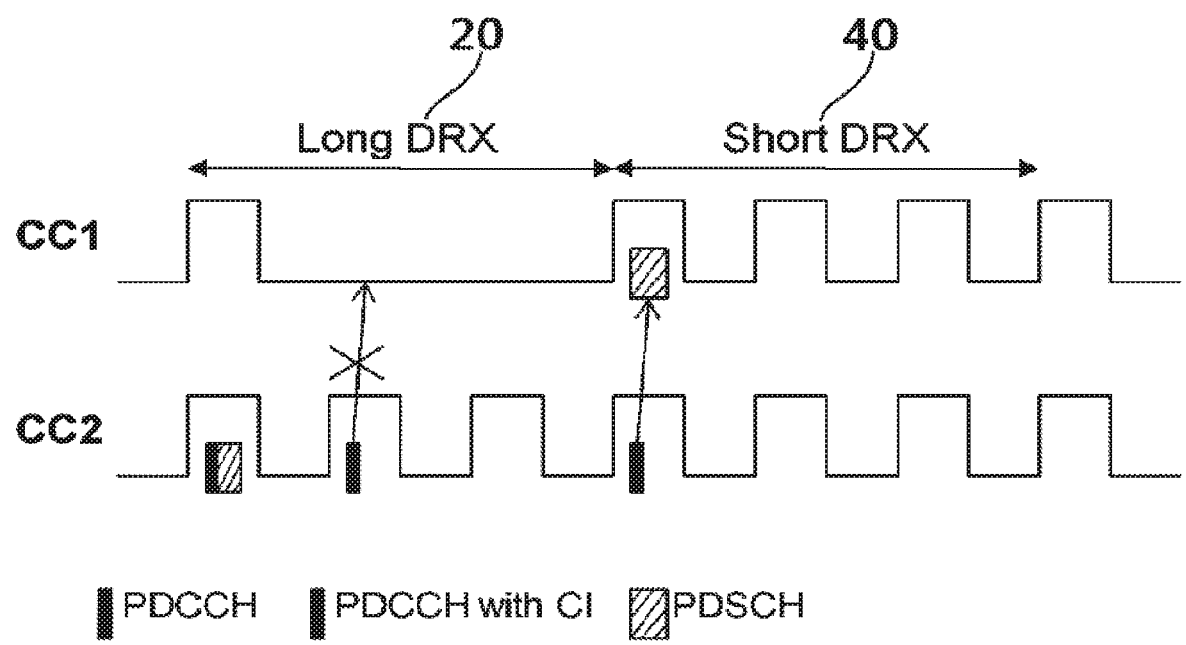
FIG. 2 is a timing diagram illustrating a DRX operation of a mobile communication system having a multi-carrier structure using a carrier indicator (CI) according to example embodiments of the present invention.

FIG. 1 is a timing diagram illustrating a discontinuous reception (DRX) operation of a terminal in a mobile communication system, and FIG. 2 is a timing diagram illustrating a DRX operation of a mobile communication system having a multi-carrier structure using a carrier indicator (CI) according to example embodiments of the present invention.

A terminal is controlled according to an on-duration period 12 in which the terminal receives a DL control channel transmitted by a base station, and a period 14 in which the terminal stops the receiving operation and performs a sleep operation to reduce power consumption. When the base station does not transmit a control channel to the terminal while the terminal performs the on-duration operation, the terminal determines that it is not necessary to receive data and switches to the sleep operation. A cycle in which the terminal performs the on-duration operation is indicated by a DRX cycle 10. The DRX cycle 10 is separately indicated by a long DRX 20 and a short DRX 40. The long DRX 20 can minimize power consumption because a data receiving cycle of the terminal is large.

A power consumption reducing operation of a terminal in a mobile communication system using multiple carriers is performed in parallel to control the multiple carriers including one PCC and at least one SCC. Thus, the terminal controls a DRX operation according to the respective carriers (PCC and SCC). More specifically, a base station transmits a message for DRX control to the terminal, and the DRX control message includes parameter values, such as an on-duration, a long DRX cycle, a short DRX cycle, and an inactivity timer, for controlling the DRX operation of the terminal. A media access control (MAC) message generated in the MAC layer can be used as the DRX control message. The MAC message can have a size of N bits (N is a natural number).

In example embodiments of the present invention, to reduce the size of a control message transmitted by a base station in a mobile communication system using multiple carriers, the base station transmits one DRX parameter group to a terminal, and the terminal receives a value of the one parameter group and sets the multiple carriers to the same parameter value. Thus, a plurality of DRX parameter groups required to transmit required parameters according to respective carriers (PCC and SCC) are not required.

When a DRX environment is set, a terminal performs an operation of receiving a DL control channel for respective carriers (PCC and SCC) according to a DRX cycle. When a DL control channel is received on a CC of the terminal, the terminal performs a data channel receiving operation. Also, the terminal continuously performs an on-duration operation and waits for a new control channel to be received in a next subframe time. This operation stands by for a time corresponding to a value of an inactivity timer, and the terminal switches to the sleep operation when a new control channel is not received during the time of the inactivity timer.

In example embodiments of the present invention, to support a DRX operation of a terminal, a base station transmits the following messages to the terminal.

1. The base station instructs the terminal to switch a DRX operation cycle for one or more CCs from a short DRX cycle to a long DRX cycle. The long DRX instruction message includes a message identity, a carrier identity, etc., and is generated at the MAC layer and transmitted.

2. The base station instructs the terminal to switch a DRX operation cycle for one or more CCs from a long DRX cycle to a short DRX cycle. The short DRX instruction message includes a message identity, a carrier identity, etc., and is generated at the MAC layer and transmitted.

3. The base station instructs the terminal to stop an operation of transmitting and receiving one or more carriers. The message is generated at an RRC layer and transmitted.

4. The base station instructs the terminal to start an operation of transmitting and receiving one or more carriers. The message is generated at the RRC layer and transmitted.

In a mobile communication system of FIG. 2 having a multi-carrier structure using a CI, a terminal interprets a control channel, e.g., a physical downlink control channel (PDCCH), received on one PCC, e.g., CC1 of FIG. 2, to demodulate the corresponding data channel, e.g., a physical downlink shared channel (PDSCH). When a CI is included in the received control channel ("PDCCH with CI" of FIG. 2), the terminal receives a data channel of an SCC corresponding to a carrier number indicated by the CI, e.g., CC2 of FIGS. 2, to demodulate data.

In this operation, a base station in the mobile communication system having the multi-carrier structure transmits the following messages to the terminal, thereby controlling DRX.

1. The base station instructs the terminal to switch a DRX operation cycle for another carrier (SCC) from a short DRX cycle to a long DRX cycle. The long DRX instruction message includes a message identity, a carrier identity, etc., and is generated at the MAC layer and transmitted.

2. The base station instructs the terminal to switch a DRX operation cycle for another carrier (SCC) from a long DRX cycle to a short DRX cycle. The short DRX instruction message includes a message identity, a carrier identity, etc., and is generated at the MAC layer and transmitted.

3. The base station instructs the terminal to stop an operation of transmitting and receiving another carrier. The message is generated at the RRC layer and transmitted.

4. The base station instructs the terminal to start an operation of transmitting and receiving another carrier. The message is generated at the RRC layer and transmitted.

Figure 3:
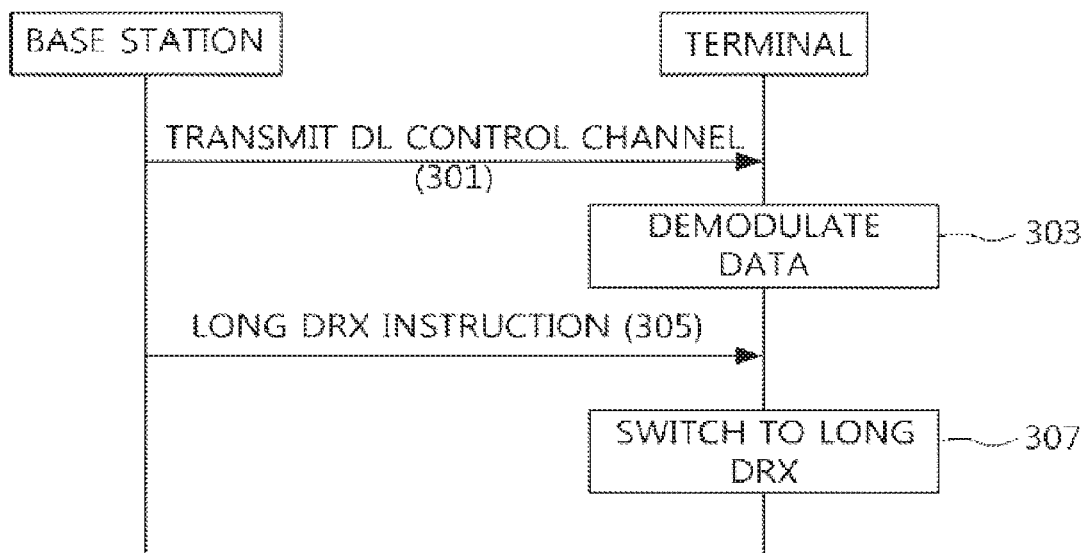
FIG. 3 is a flowchart illustrating a process of switching a DRX operation cycle for one or more carriers from a short DRX cycle to a long DRX cycle in a downlink (DL) of a mobile communication system using multiple carriers according to example embodiments of the present invention.
Figure 4:
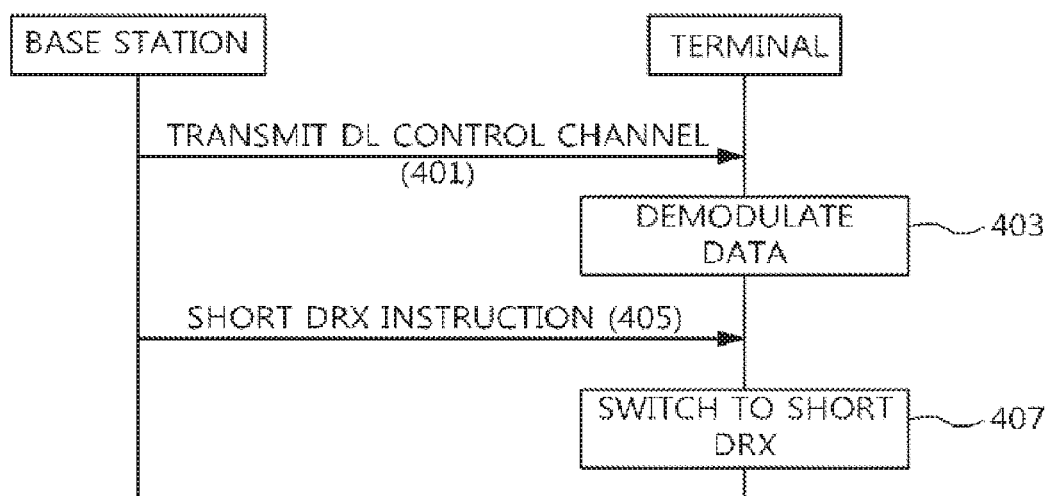
FIG. 4 is a flowchart illustrating a process of switching a DRX operation cycle for one or more carriers from a long DRX cycle to a short DRX cycle in a DL of a mobile communication system using multiple carriers according to other example embodiments of the present invention.

FIG. 3 is a flowchart illustrating a process of switching a DRX operation cycle for one or more carriers from a short DRX cycle to a long DRX cycle in a DL of a mobile communication system using multiple carriers according to example embodiments of the present invention, and FIG. 4 is a flowchart illustrating a process of switching a DRX operation cycle for one or more carriers from a long DRX cycle to a short DRX cycle in a DL of a mobile communication system using multiple carriers according to other example embodiments of the present invention.

A process of switching a DRX operation cycle for one or more carriers from a short DRX cycle to a long DRX cycle in a DL of a mobile communication system using multiple carriers according to example embodiments of the present invention will be described in detail below.

Referring to FIG. 3, first, a base station transmits a DL control channel, e.g., a PDCCH, to a terminal (operation 301). The DL control channel may include a CI (Carrier Indicator). By cross-carrier scheduling with a CI, a PDCCH of a serving cell can schedule resources of another serving cell. For example, using a CI, a PDCCH can allocate PDSCH or physical uplink shared channel (PUSCH) resources of one CC among multiple carriers.

When the DL control channel is received, the terminal interprets the DL control channel, receives a data channel, e.g., a PDSCH, of a PCC or SCC corresponding to a carrier number indicated by the CI of the DL control channel, and demodulates data (operation 303). In other words, when a CI is included in the received control channel ("PDCCH with CI" of FIG. 2), the terminal receives a data channel of a SCC corresponding to a carrier number indicated by the CI, e.g., CC2 of FIG. 2, to demodulate data.

When the amount of data corresponding to a predetermined threshold value or less is in a buffer for a predetermined time, the base station transmits a long DRX instruction message, which instructs the terminal to switch to long DRX, to the terminal (operation 305), and the terminal receives the long DRX instruction message and switches to long DRX (operation 307). The long DRX instruction message can include a message identity, a carrier identity, and so on. A MAC message generated in the MAC layer can be used as the long DRX instruction message. The MAC message can have a size of, for example, N bits (N is a natural number).

A process of switching a DRX operation cycle for one or more carriers from a long DRX cycle to a short DRX cycle in a DL of a mobile communication system using multiple carriers according to other example embodiments of the present invention will be described in detail below.

Referring to FIG. 4, first, a base station transmits a DL control channel, e.g., a PDCCH, to a terminal (operation 401). The DL control channel may include a CI. By cross-carrier scheduling with a CI, a PDCCH of a serving cell can schedule resources of another serving cell. For example, using a CI, a PDCCH can allocate PDSCH or PUSCH resources of one CC among multiple carriers.

When the DL control channel is received, the terminal interprets the DL control channel, receives a data channel, e.g., a PDSCH, of a PCC or SCC corresponding to a carrier number indicated by the CI of the DL control channel, and demodulates data (operation 403).

When the amount of data corresponding to a predetermined threshold value or less is in a buffer for a predetermined time and then increases, the base station transmits a short DRX instruction message, which instructs the terminal to switch to short DRX, to the terminal (operation 405), and the terminal receives the short DRX instruction message and switches to short DRX (operation 407). The Long DRX instruction message can include a message identity, a carrier identity, and so on. A MAC message generated in the MAC layer can be used as the short DRX instruction message. The MAC message can have a size of, for example, N bits (N is a natural number).

In a multi-carrier environment using a CI, a DRX operation of one CC is influenced by receiving of a control channel of another CC. Thus, in example embodiments of the present invention, when one carrier is instructed to receive a data channel by another carrier, a terminal carries out a procedure as if a control channel was received on a carrier of the terminal.

When a terminal receives a DL control channel, e.g., a PDCCH, in a long DRX period state in which the terminal receives a DL channel at long periods, the terminal immediately switches to a short DRX period state, thereby receiving data at short periods. In this procedure, it is necessary to reduce power consumption of the terminal caused when the terminal receives meaningless data and switches from a long DRX period to a short DRX period.

In example embodiments of the present invention, when a terminal receives a DL control channel, e.g., a PDCCH, in the long DRX period state but does not need to switch to the short DRX period state after demodulating the PDCCH or a PDSCH, the terminal stays in the long DRX period state. To be specific, after receiving a PDCCH, the terminal demodulates the PDCCH and PDSCH to determine whether or not a type of data requires continuous data communication, and switches to a short DRX period only when continuous data communication is required.

Continuous data communication is not required in the following cases.
  A base station allocates UL radio resources, but there is no data in a buffer of a terminal.
  A base station requests UL transmission to maintain UL synchronization.
  A base station requests UL transmission to retrieve location information about a terminal.
  A base station requests a DL channel state report.

When continuous data communication is not required as mentioned above, the terminal can continuously perform a long DRX period operation to minimize power consumption according to a procedure proposed in example embodiments of the present invention.

Figure 5:
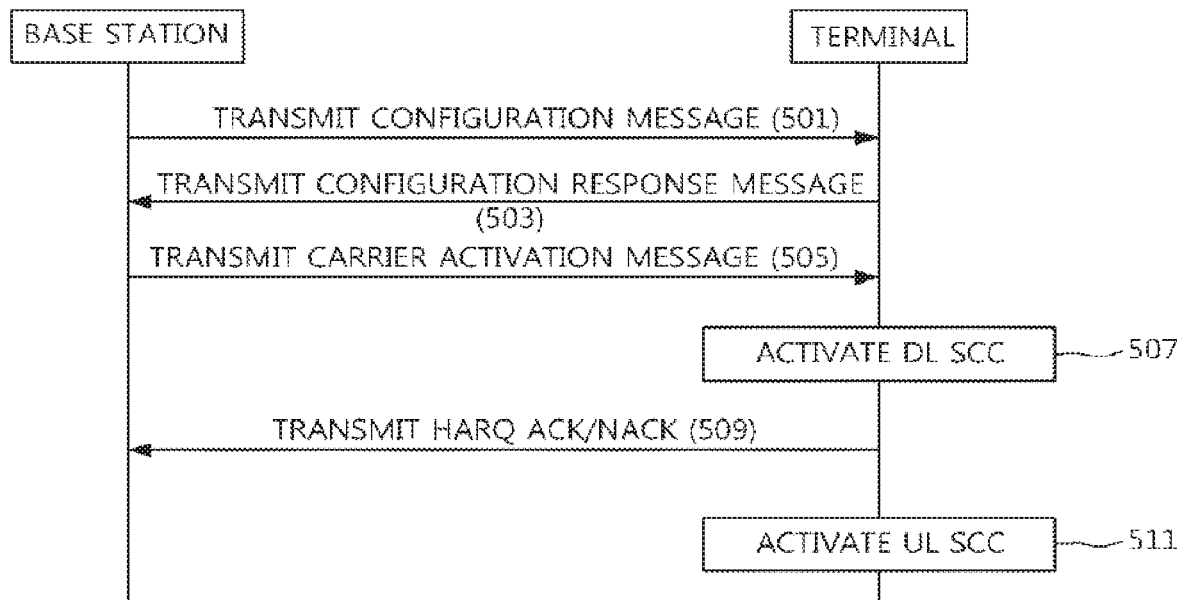
FIG. 5 is a flowchart illustrating a process for a base station to activate a carrier of a terminal in a mobile communication system using multiple carriers.
Figure 6:
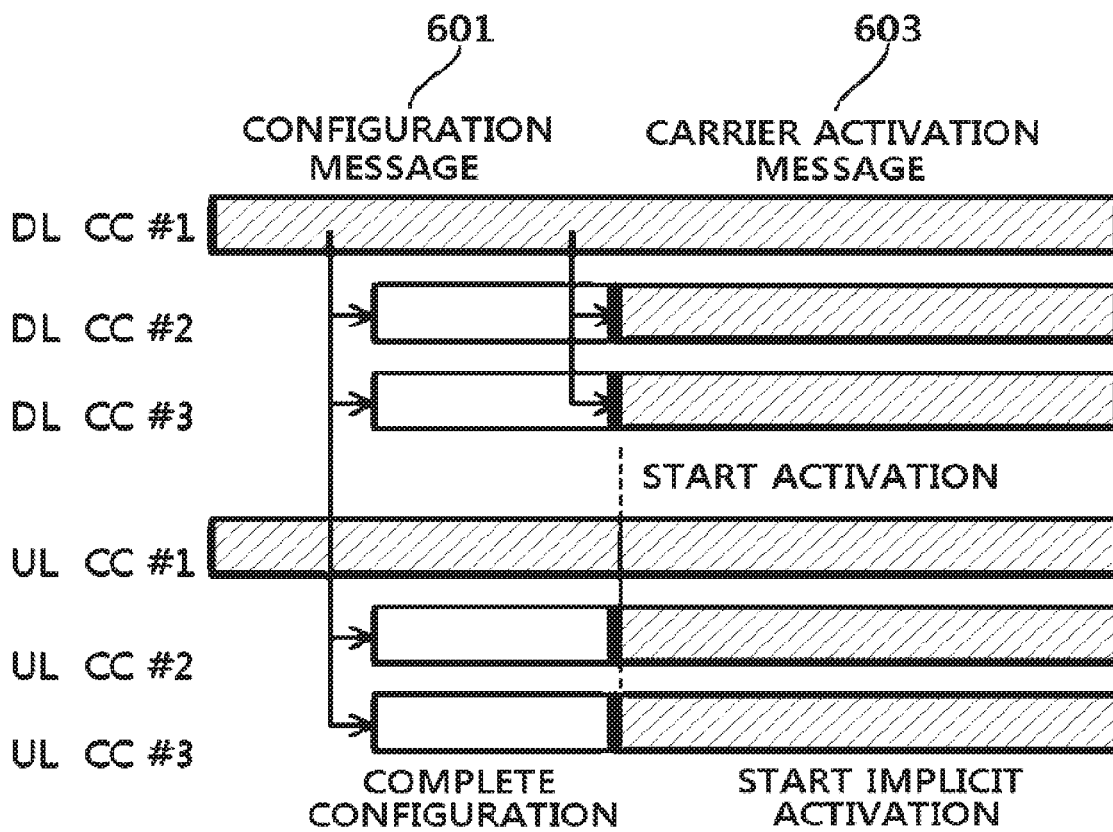
FIG. 6 is a conceptual diagram illustrating a process for a base station to activate a carrier of a terminal in a mobile communication system using multiple carriers.
Figure 7:
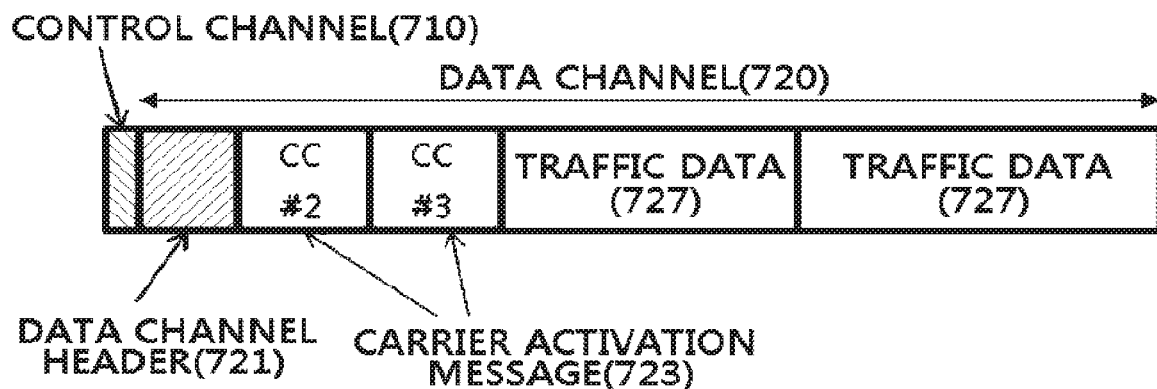
FIG. 7 illustrates a structure of a carrier activation message transmitted to a terminal by a base station.

FIG. 5 is a flowchart illustrating a process for a base station to activate a carrier of a terminal in a mobile communication system using multiple carriers, and FIG. 6 is a conceptual diagram illustrating a process for a base station to activate a carrier of a terminal in a mobile communication system using multiple carriers. FIG. 7 illustrates a structure of a carrier activation message transmitted to a terminal by a base station.

A process for a base station to activate a carrier of a terminal in a mobile communication system using multiple carriers will be described in detail below with reference to FIGS. 5 to 7.

In an idle mode and an initial access mode for a base station, a terminal communicates with the base station using a single carrier, e.g., CC #1 for a DL and CC #1 for a UL as shown in FIG. 6.

In the idle mode or the initial access mode in a mobile communication system using multiple carriers, the base station transmits a configuration message to the terminal so that the terminal controls a plurality of CCs, thereby performing a configuration procedure (operation 501). The configuration message can be transmitted by the base station using an RRC message. The RRC message can include the number of additional Scells and multi-SCC control information. The configuration message can be the RRC message and can be used to add, modify, or release an Scell. The RRC message can be transmitted through a dedicated channel.

After receiving the configuration message, the terminal transmits a configuration response message as a receiving completion message to the base station (operation 503). As a result, for example, the configuration procedure for DL CC #2 and CC #3 is complete as illustrated in FIG. 6.

The terminal having completed the configuration procedure stores control information for the multiple carriers included in the configuration message transmitted by the base station, but stands by to reduce power consumption of the terminal itself without performing communication using a carrier (e.g., DL CC #2 or DL CC #3 shown in FIG. 2) specified in the configuration message. To be specific, the terminal does not receive a control channel of the configured carriers DL CC #2 and DL CC #3, and does not measure a channel state either.

After the configuration procedure is complete, the base station transmits a carrier activation message to the terminal, thereby performing a carrier activation procedure (operation 505). The terminal receives the carrier activation message to activate the corresponding carrier (operation 507). For example, DL CC #2 and DL CC #3 are activated as shown in FIG. 6. After receiving the carrier activation message, the terminal transmits an ACK/NACK to the base station (operation 509). The ACK/NACK may be sent immediately after the terminal receives the carrier activation message, or after the terminal receives the carrier activation message and then activates the corresponding carrier (operation 507). When the activation procedure is complete, the terminal actually uses the activated carrier for communication with the base station. Through the above-described operations, a DL multi-carrier activation procedure is carried out.

A carrier activation message according to example embodiments of the present invention is transmitted through a data channel 720 transmitted to a terminal by a base station, and can be a MAC control message as shown in FIG. 7. Referring to FIG. 7, the MAC control message includes a control channel 710 and a data channel 720, and the data channel 720 may consist of a data channel header 721, a carrier activation message 723, and traffic data 727. In other words, the carrier activation message 723 can be included in the data channel 720 of the MAC control message.

The carrier activation message 723 can include an activation or deactivation carrier identity. The carrier activation message 723 may further include an activation or deactivation identity. The carrier activation message 723 may be transmitted along with traffic data, which is transmitted to the terminal by the base station, by a piggyback mechanism. A plurality of carrier activation messages may be stored in one data channel and transmitted.

When the carrier activation procedure is complete and a plurality of carriers are activated, all the activated carriers perform the power consumption reducing operation through the DRX procedure illustrated in FIGS. 1 and 2, and the terminal communicates with the base station using all the activated carriers. The activated carriers can be switched to the standby state when the base station transmits a carrier deactivation message to the terminal. The carrier deactivation message can have the same format as the carrier activation message. In other words, the carrier deactivation message can be included in a data channel of a MAC control message and transmitted, and can include a deactivation carrier identity.

A UL carrier activation procedure according to example embodiments of the present invention can be carried out in the same manner as the above-described DL carrier activation procedure. In other words, the base station transmits a configuration message and a carrier activation message to the terminal, so that the UL carrier activation procedure can be carried out.

During the UL carrier activation procedure, the base station can include a transmission cycle of a physical control channel (e.g., a PUCCH or sounding reference symbol (SRS)) or information for separately indicating a transmission start in the configuration message and transmit the configuration message to the terminal. Alternatively, the transmission cycle of a physical control channel (e.g., a PUCCH or SRS) or the information for separately indicating a transmission start may be included in the carrier activation message and transmitted to the terminal. For example, a transmission cycle of a PUCCH, which is a UL control channel, or SRS may be included in the carrier activation message and transmitted to the terminal.

Using a format similar to that of the carrier activation message of FIG. 6, the configuration message for activating a UL carrier may be transmitted along with traffic data, which is transmitted to the terminal by the base station, by a piggyback mechanism. Also, a plurality of carrier activation messages may be stored in one data channel and transmitted.

Alternatively, a UL carrier activation procedure can be controlled in connection with DL carrier activation. When UL control is performed in connection with DL control, the number of control message transmissions between the base station and the terminal and the amount of control data are reduced.

A UL carrier configuration procedure according to other example embodiments of the present invention can be carried out in connection with a DL carrier configuration procedure at the same time.

The UL carrier activation procedure carried out after the DL carrier configuration procedure can be simultaneously performed with a DL activation procedure. To be specific, mapping information about a UL carrier interoperating with a DL carrier can be included in the DL configuration message of operation 501 and transmitted to the terminal. The carrier mapping information can indicate that DL CC #2 interoperates with UL CC #2 as illustrated in FIG. 6 and hybrid automatic repeat request (HARQ) ACK/NACK transmission resources operate in connection with each other, and also indicate that DL CC #3 interoperates with UL CC #3 and HARQ ACK/NACK transmission resources operate in connection with each other. Further, the carrier mapping information can indicate that a PDCCH indicating permission for transmission of a UL data channel operates in connection with resource information about the UL data channel (PUSCH). Thus, the base station includes all mapping information in the configuration message, transfers the configuration message to the terminal in advance, and thus can implicitly start UL carrier activation as soon as a DL activation message is received by the terminal without transmitting a UL carrier activation message to the terminal (operation 511 of FIG. 5). For example, as illustrated in FIG. 6, after the carrier activation message of operation 505 is received, the terminal can activate the corresponding carrier (DL CC #2 and DL CC #3) and implicitly activate UL CC #2 and UL CC #3 at the same time.

When a DL carrier is instructed to be activated, the terminal can activate a UL carrier mapped to the DL carrier and use the UL carrier for communication. Thus, when the base station makes an instruction for UL data transmission, an activated UL carrier can be used when the terminal transmits data to the base station, and a UL control channel (e.g., a PUCCH or SRS) can be transmitted according to a set condition. An activated UL carrier can be deactivated as soon as a deactivation procedure of a previously mapped DL carrier is complete.

A UL carrier whose activation procedure is complete requires the base station and the terminal to operate in synchronization with each other. Thus, the base station and the terminal manage a UL synchronization timer, thereby managing synchronization. The base station sets the timer at a point in time that synchronization of the terminal is maintained to store the maximum synchronization maintenance time. After this, when a value of the timer is due at a point in time that an activation message is received and synchronization is lost, the base station restores synchronization of the carrier using a random access procedure and then performs an activation operation. When the random access procedure is successful, the base station and the terminal reset the timer to the maximum synchronization maintenance time, and carry out a synchronization maintenance procedure using a data channel in a UL data transceiving state.

Different numbers of DL carriers and UL carriers may be mapped to each other. Even when different numbers of DL carriers and UL carriers are mapped to each other, a UL carrier configuration procedure can be carried out in connection with a DL carrier configuration procedure at the same time. Even when different numbers of DL carriers and UL carriers are mapped to each other, mapping information is included in a configuration message and transmitted to the terminal in advance by the base station, so that UL carrier activation can be implicitly started as soon as a DL activation message is received by the terminal without transmitting a UL carrier activation message to the terminal.

While the example embodiments of the present invention and their advantages have been described in detail, it should be understood that various changes, substitutions and alterations may be made herein without departing from the scope of the invention.

What is claimed is:
1. A communication method, comprising:
    receiving, by a user equipment (UE), a first message related to a first discontinuous reception cycle;

monitoring, by the UE, a physical downlink control channel (PDCCH) on a first component carrier based on the first discontinuous reception cycle;

receiving, by the UE, a second message related to a second discontinuous reception cycle;

monitoring, by the UE, the PDCCH on the first component carrier based on the second discontinuous reception cycle;

receiving, by the UE, first control information through the PDCCH on the first component carrier, wherein the first control information identifies a second component carrier; and receiving, by the UE, data through a physical downlink shared channel (PDSCH) on the second component carrier based on the first control information, wherein the second discontinuous reception cycle is different from the first discontinuous reception cycle.

2. The method of claim 1, wherein:
the first message also indicates a first period during which control information is received through the PDCCH and a second period during which control information is not received through the PDCCH, wherein the first discontinuous reception cycle comprises the first period and the second period.

3. The method of claim 1, wherein the second message is received through a physical downlink shared channel (PDSCH) of the first component carrier.

4. The method of claim 1, further comprising:
in response to receiving the data through the PDSCH on the second component carrier, terminating a discontinuous reception operation on the first component carrier.

5. The method of claim 1, wherein the first control information comprises a carrier indicator (CI) of the second component carrier.

6. The method of claim 1, wherein the second discontinuous reception cycle is longer than the first discontinuous reception cycle.

7. A user equipment (UE), comprising:
a circuitry which is configured to:
cause the UE to receive a first message related to a first discontinuous reception cycle;
cause the UE to monitor a physical downlink control channel (PDCCH) on a first component carrier based on the first discontinuous reception cycle;
cause the UE to receive a second message related to a second discontinuous reception cycle;
cause the UE to monitor the PDCCH on the first component carrier based on the second discontinuous reception cycle;
cause the UE to receive first control information through the PDCCH on the first component carrier, wherein the first control information identifies a second component carrier; and
cause the UE to receive data through a physical downlink shared channel (PDSCH) on the second component carrier based on the first control information,
wherein the second discontinuous reception cycle is different from the first discontinuous reception cycle.

8. The UE of claim 7, wherein:
the first message also indicates a first period during which control information is received through the PDCCH and a second period during which control information is not received through the PDCCH, wherein the first discontinuous reception cycle comprises the first period and the second period.

9. The UE of claim 7, wherein the second message is received through a physical downlink shared channel (PDSCH) of the first component carrier.

10. The UE of claim 7, wherein the circuitry is further configured to:
cause the UE to, in response to receiving the data through the PDSCH on the second component carrier, terminate a discontinuous reception operation on the first component carrier.

11. The UE of claim 7, wherein the first control information comprises a carrier indicator (CI) of the second component carrier.

12. The UE of claim 7, wherein the second discontinuous reception cycle is longer than the first discontinuous reception cycle.

13. A communication device for a user equipment (UE), the communication device comprising:
a circuitry which is configured to:
cause the UE to receive a first message related to a first discontinuous reception cycle;
cause the UE to monitor a physical downlink control channel (PDCCH) on a first component carrier based on the first discontinuous reception cycle;
cause the UE to receive a second message related to a second discontinuous reception cycle;
cause the UE to monitor the PDCCH on the first component carrier based on the second discontinuous reception cycle;
cause the UE to receive first control information through the PDCCH on the first component carrier, wherein the first control information identifies a second component carrier; and
cause the UE to receive data through a physical downlink shared channel (PDSCH) on the second component carrier based on the first control information,
wherein the second discontinuous reception cycle is different from the first discontinuous reception cycle.

14. The communication device of claim 13, wherein:
the first message also indicates a first period during which control information is received through the PDCCH and a second period during which control information is not received through the PDCCH, wherein the first discontinuous reception cycle comprises the first period and the second period.

15. The communication device of claim 13, wherein the second message is received through a physical downlink shared channel (PDSCH) of the first component carrier.

16. The communication device of claim 13, wherein the circuitry is further configured to:
cause the UE to, in response to receiving the data through the PDSCH on the second component carrier, terminate a discontinuous reception operation on the first component carrier.

17. The communication device of claim 13, wherein the first control information comprises a carrier indicator (CI) of the second component carrier.

18. The communication device of claim 13, wherein the second discontinuous reception cycle is longer than the first discontinuous reception cycle.

* * * * *